US007543690B2

(12) United States Patent
Eckenstein et al.

(10) Patent No.: US 7,543,690 B2
(45) Date of Patent: *Jun. 9, 2009

(54) CABLE BRAKE FOR AN ELEVATOR

(75) Inventors: Rudolf Eckenstein, Baar (CH); Carlos Latorre Marcuz, Shanghai (CN)

(73) Assignee: Inventio AG, Hergiswil NW (CH)

(*) Notice: Subject to any disclaimer, the term of this patent is extended or adjusted under 35 U.S.C. 154(b) by 0 days.

This patent is subject to a terminal disclaimer.

(21) Appl. No.: 11/304,008

(22) Filed: Dec. 15, 2005

(65) Prior Publication Data

US 2006/0090969 A1 May 4, 2006

(51) Int. Cl.
*B60T 7/12* (2006.01)

(52) U.S. Cl. ...................... 188/137; 188/188; 188/65.1; 188/139

(58) Field of Classification Search ................ 188/65.1, 188/188, 180, 161, 65.2–65.5, 166–173; 187/265, 350, 351, 374; 182/5, 71, 72
See application file for complete search history.

(56) References Cited

U.S. PATENT DOCUMENTS

| | | | | | |
|---|---|---|---|---|---|
| 1,738,214 | A | * | 12/1929 | Thurston | 187/254 |
| 1,864,588 | A | * | 6/1932 | Dunlop | 187/373 |
| 1,934,508 | A | * | 11/1933 | McCormick | 187/375 |
| 3,327,811 | A | * | 6/1967 | Mastroberte | 187/305 |
| 3,669,223 | A | * | 6/1972 | Arnold | 188/188 |
| 4,006,799 | A | * | 2/1977 | Binder et al. | 187/305 |
| 4,923,055 | A | * | 5/1990 | Holland | 187/287 |
| 5,101,937 | A | | 4/1992 | Burrell et al. | |
| 5,197,571 | A | * | 3/1993 | Burrell et al. | 187/350 |
| 5,217,091 | A | * | 6/1993 | Shiina et al. | 187/351 |
| 5,228,540 | A | | 7/1993 | Glaser | |
| 5,299,661 | A | * | 4/1994 | Pramanik et al. | 187/373 |
| 5,628,385 | A | | 5/1997 | Yumura et al. | |
| 5,653,312 | A | * | 8/1997 | Kato | 187/350 |
| 6,223,868 | B1 | * | 5/2001 | Wullimann | 188/188 |
| 7,287,627 | B2 | * | 10/2007 | Eckenstein et al. | 188/137 |

FOREIGN PATENT DOCUMENTS

| | | |
|---|---|---|
| DE | 142 032 | 6/1980 |
| DE | 196 35 244 | 3/1998 |
| EP | 0 651 724 B1 | 5/1995 |
| WO | WO94/02404 | 2/1994 |

* cited by examiner

*Primary Examiner*—Robert A Siconolfi
*Assistant Examiner*—Mariano Sy
(74) *Attorney, Agent, or Firm*—Fraser Clemens Martin & Miller LLC; William J. Clemens

(57) ABSTRACT

A cable brake has an electromagnet for selectively releasing a mass to fall down guide rods under the effect of gravity and impact a trigger lever to release a crossbar from a pawl, whereupon pressure springs move a brake plate against a cable strand to halt the cable strand. The pressure springs extend between a first pressure plate at the brake plate and a spaced second pressure plate that can be displaced along a path by a cooperating screw and nut to pre-stress the pressure springs. The pressure springs are relaxed in one end position of the path whereby the crossbar connected to the first pressure plate by a release bar is engaged by the pawl in a starting position.

14 Claims, 7 Drawing Sheets

CABLE BRAKE FOR AN ELEVATOR

BACKGROUND OF THE INVENTION

The present invention relates to a cable brake for an elevator to halt a cable strand by applying a brake plate on the cable strand, and having a release trigger mechanism to introduce the brake action and apply the braking force of the brake plate, the brake plate being returnable to an initial position after the brake action by a return mechanism.

The patent document EP 0 651 724 B1 shows a cable brake wherein the elevator car supporting cables extend between two brake plates. The one brake plate is connected with the brake enclosure and the other brake plate is moveable. Each of a pair of links has one end pivotally connected with the other brake plate and an opposite end engaging a cam follower. The cam follower is released by an electromagnetic latch controlled by an overspeed governor and rides on a pair of cam surfaces under the force of a pair of springs to move the other brake plate toward the one brake plate to clamp the cables and stop movement of the elevator car. The initial compression of the springs is by a hydraulic cylinder.

A disadvantage of this equipment is that the cable brake is expensive. The trigger mechanism, the cam follower and cam surfaces, and the brake enclosure are costly to manufacture and time consuming to install.

SUMMARY OF THE INVENTION

The present invention provides a remedy. The present invention avoids the disadvantages of the known equipment and provides a simple and reliably working cable brake.

The advantages provided by the present invention are essentially in that the release of the cable brake takes place by gravity. The trigger mechanism is simple to build. The gravity actuated mass element of the cable brake improves which the trigger Release reliability improves, sudden. The simple return mechanism is further advantageous with a twofold function. The cable brake can be made operational again by the return mechanism after a trigger release. Moreover, the pressure springs of the return mechanism can be pre-stressed differently according to load as well as a speed of the elevator car. Furthermore, the simple cable brake does not require additional equipment, is practically maintenance-free and needs no external energy input. The cable brake according to the present is inexpensive to manufacture and install.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
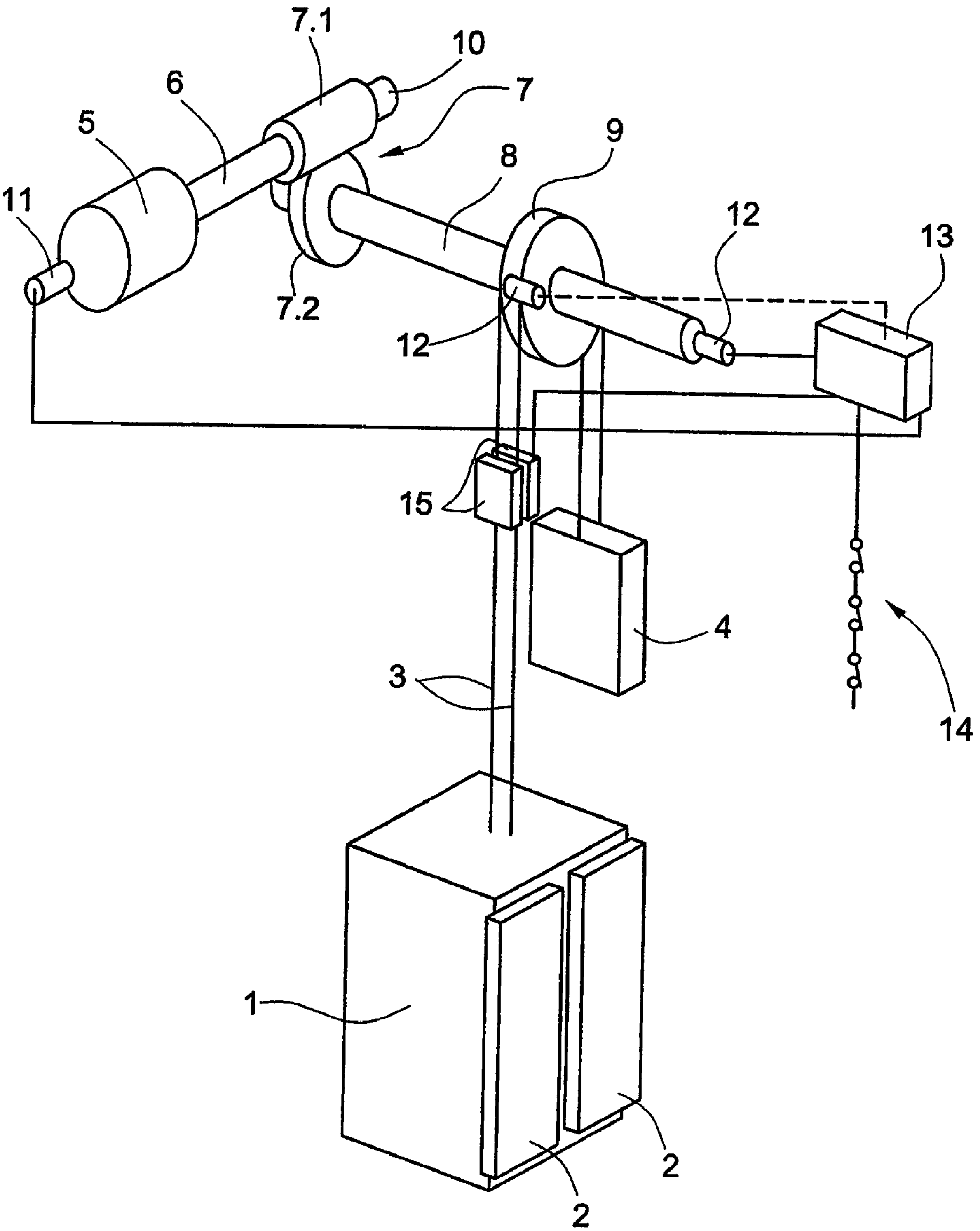
FIG. 1 is a schematic representation of an elevator installation with the cable brake according to the present invention.

FIG. 1 is a schematic representation of an elevator installation with a cable brake according to the present invention providing braking security. In a not illustrated elevator shaft, an elevator car 1 with doors 2 is connected by cable strands 3 with a counterweight 4 for vertical movement in the elevator shaft. An electric motor 5 drives a gear mechanism 7 by an input shaft 6. At an output shaft 8 of the gear mechanism 7 is mounted a drive sheave 9 for driving the cable strands 3. The gear mechanism 7 includes a worm 7.1 at the input shaft 6 and a mating gear 7.2 at the output shaft 8. Other mechanism-types like, for example, a crown gear set are also possible. A motor brake 10 is attached to a free end of the input shaft 6.

At the opposite end of the input shaft 6 is a first encoder 11 for sensing the speed of the input shaft 6. At and end of the output shaft 8 is mounted a second encoder 12 for sensing the speed of the output shaft 8. As a variation, the second encoder 12 can, as shown by a dashed line, instead of sensing the speed of the output shaft 8 sense the speed of the drive sheave 9 or the movement of the cables 3. The signals generated by the encoders 11, 12 are inputs to a controller 13 that also is connected to a safety relay chain 14 and has an output for activating a cable brake 15 according to the present invention. The controller 13 and the encoders 11, 12 form a detector to monitor the speeds of the input shaft 6 and the output shaft 8 and to generate an activation signal for the cable brake 15.

Figure 2:
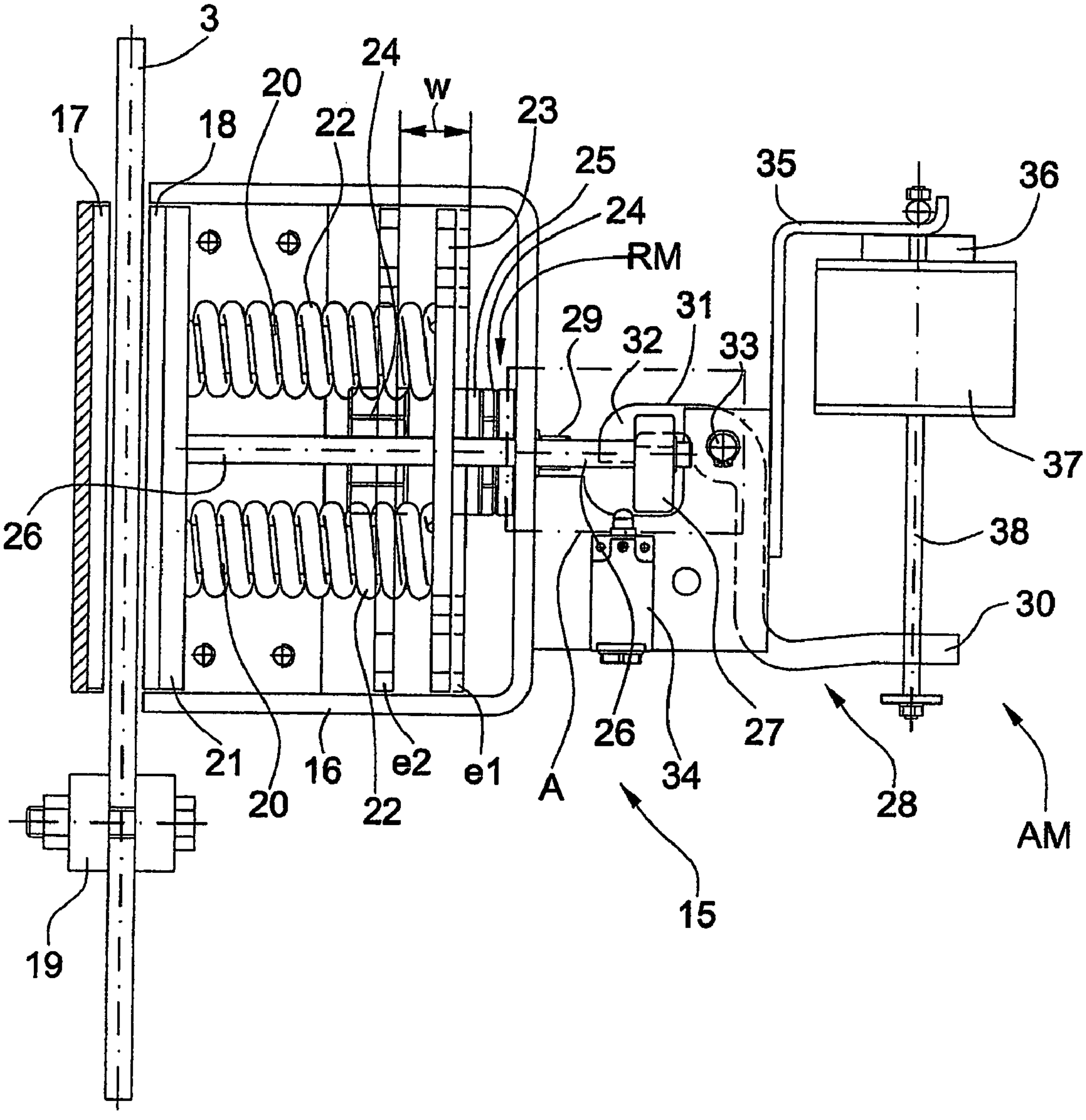
FIG. 2 is a side elevation view of the cable brake according to the present invention with a vertical cable path.

FIG. 2 shows the principal construction of the cable brake 15 with a vertical cable path. The cable brake 15 includes a housing 16 at which a first brake plate 17 (shown in cross section) is fixed and a second brake plate 18 is movably mounted. During normal operation, the cable strands 3 move vertically between the brake plates 17, 18. The cable strands 3 are arranged in a plane extending parallel to braking surfaces of the brake plates 17, 18 and are held by a clamp 19. Attached to the second brake plate 18 is a first pressure plate 21 having a plurality of rods 20 extending away from the brake plate 18. The rods 20 each carry a pressure spring 22 that is retained between the first pressure plate 21 and a second pressure plate 23 in the housing 16. The second pressure plate 23 is movable in the housing 16 by means of a screw 24 and a cooperating nut 25 along a pat "w" to pre-stress the pressure springs 22 according to position of the second pressure plate 23. In a first position "el" of the plate 23, the pressure springs 22 are relaxed. A pair of release bars 26 each have one end attached to the first pressure plate 21 and an opposite free end movable relative a pawl 32. The release bars 26 extend through the second pressure plate 23 and the housing 16 and have the free ends connected by a crossbar 27. After engagement of the crossbar 27 with the pawl 32 of a first trigger lever 28, the adjusting screw 24 is turned at a screw head 29 whereby the second pressure plate 23 is moved from the position "e1" to reach a desired position along the path "w". The screw 24 with the screw head 29 and the nut 25 form a return mechanism RM for resetting the brake at the position "e1". The second pressure plate 23 is movable until reaching a final position "e2". The working position of the second pressure plate 23 is dependent on the pressure springs 22, the elevator car 1 and the load as well as the nominal speed of the elevator car 1.

The first trigger lever 28 has a first arm 30 and a second arm 31 with the pawl 32, the arms extending from a first axis 33 of rotation. In operation, the pawl 32 is engaged with the crossbar 27. The position of the crossbar 27 is sensed, for example, by a limit switch 34. At a bracket 35 there is mounted an electromagnet 36 that, in an activated condition, holds a mass element 37 in the upper position shown. The bracket 35, the electromagnet 36, the mass element 37, a pair of guide rods 38 and the first trigger lever 28 form a release mechanism AM.

Figure 6:
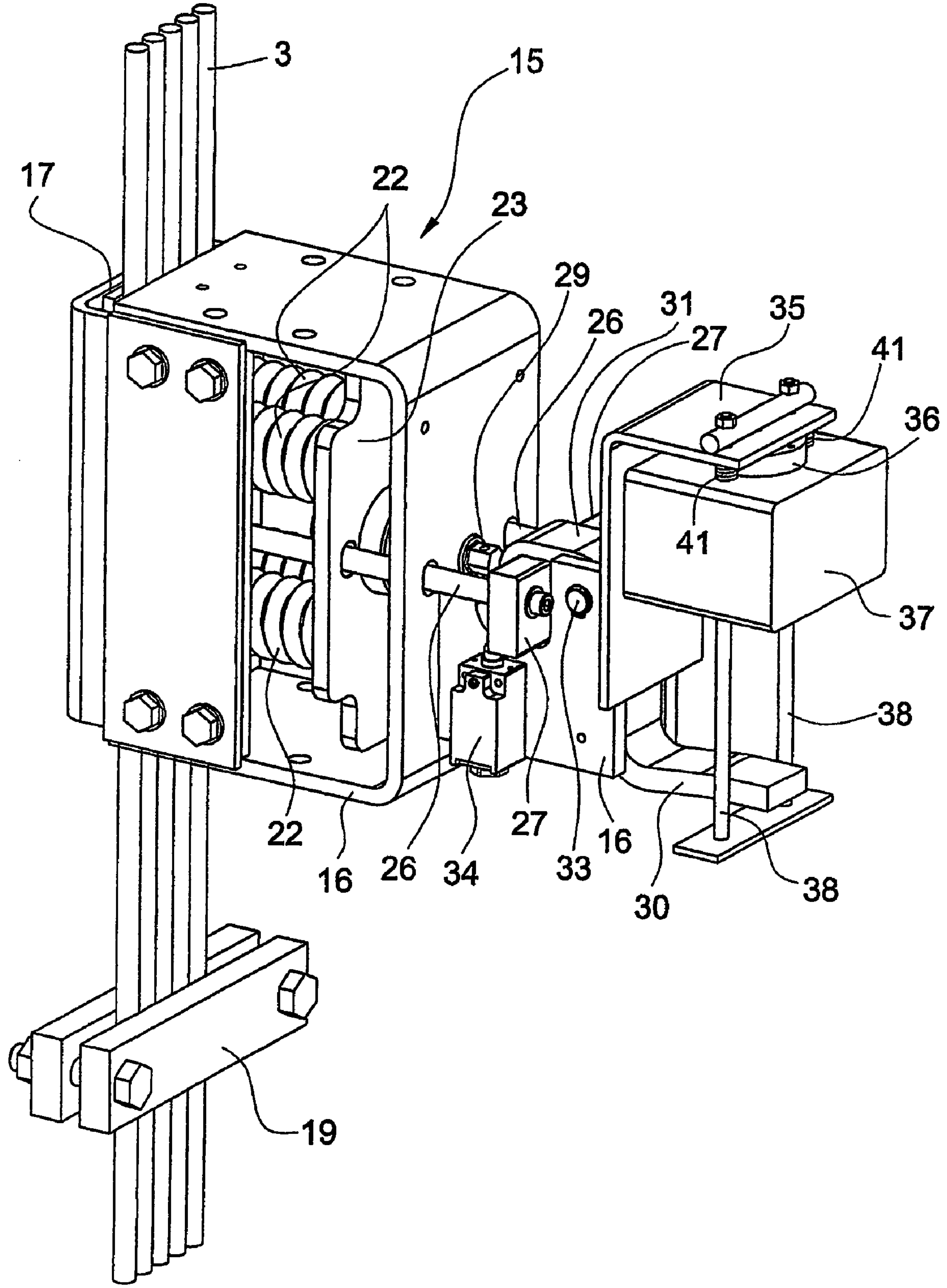
FIG. 6 is a perspective view of the cable brake shown in FIG. 2.

As soon as the electromagnet 36 is switched off, the mass element 37 falls downwardly along the guide rods 38 under effect of the gravity and strikes the first arm 30 of the first trigger lever 28. Springs 41 (FIG. 6) will assist in returning the mass element 37 to the electromagnet 36 that is switched back on. Through rotation of the first trigger lever 28 about the axis 33, the pawl 32 releases the crossbar 27 and, aided by the pressure springs 22, the freed release bars 26 move the brake plate 18 to press against the cable strands 3.

Figure 3:
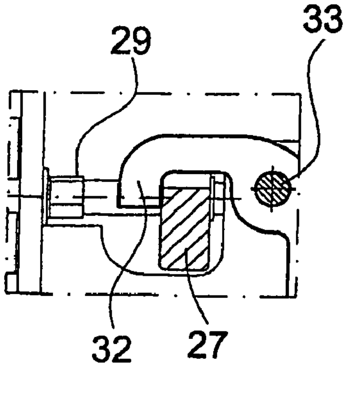
FIGS. 3-5 are enlarged views of the trigger mechanism operation of the cable brake shown in FIG. 2.
Figure 4:
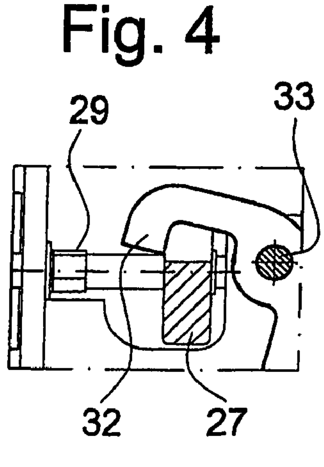
Figure 5:
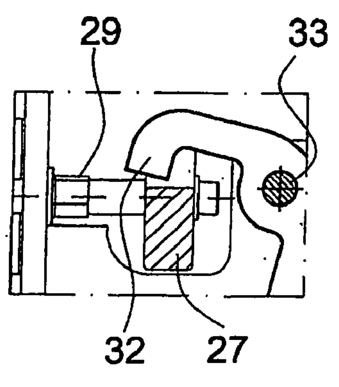

FIG. 3, FIG. 4 and FIG. 5 show the portion of the cable brake 15 in an area "A" of the release mechanism AM. FIG. 3 shows the cable brake 15 in a normal operating state. The pawl 32 is engaged with the crossbar 27. The cable strands 3 pass between the brake plates 17, 18 freely. FIG. 4 shows the position of the pawl 32 after the impact of the mass element 37 on the first arm 30 of the first trigger lever 28. The crossbar 27 is set free and the braking of the cable strands 3 is imminent. FIG. 5 shows the position of the crossbar 27 after the pressure springs 22 have pressed the second brake plate 18 against the cable strands 3.

Figure 7:
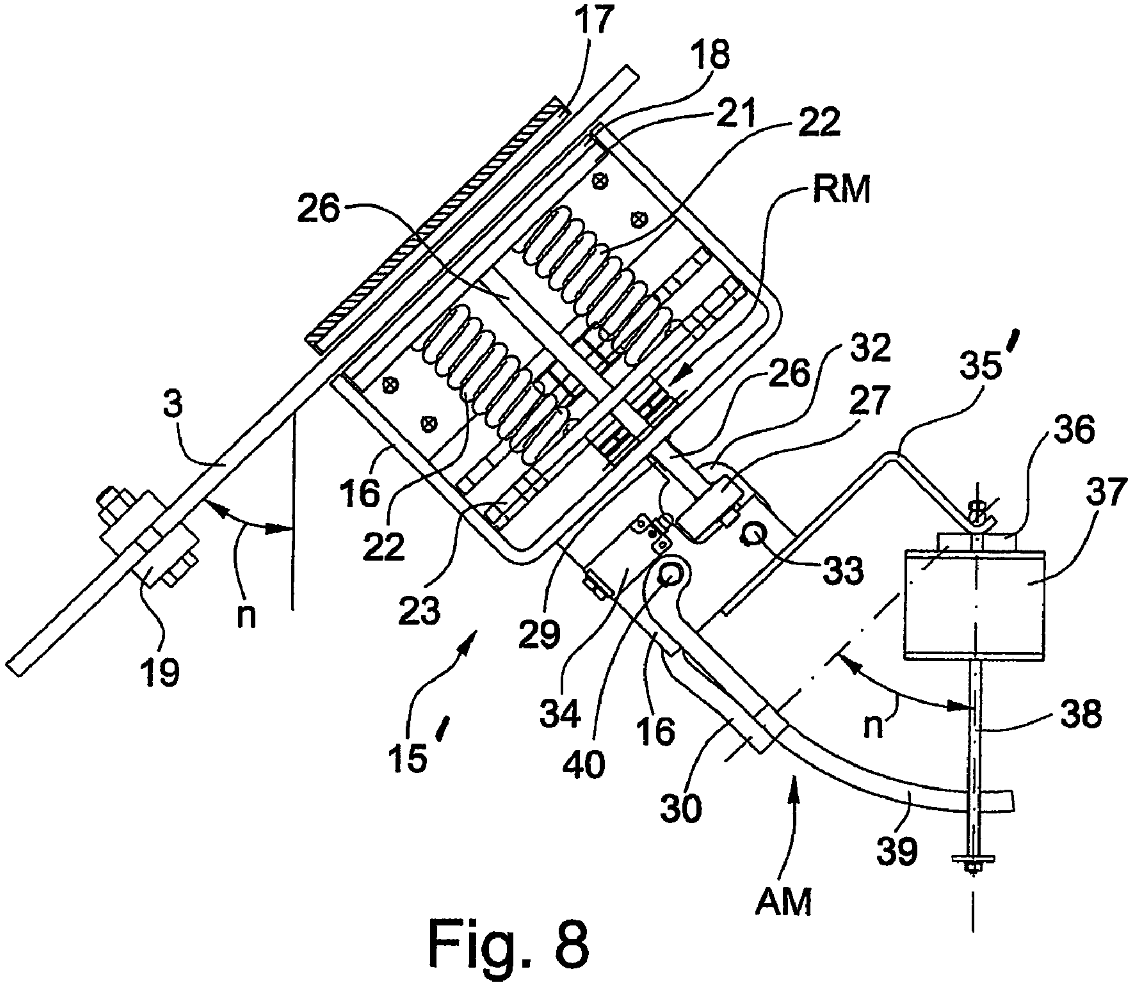
FIG. 7 and FIG. 8 are side elevation views of the cable brake according to the present invention with an angled cable path.
Figure 8:
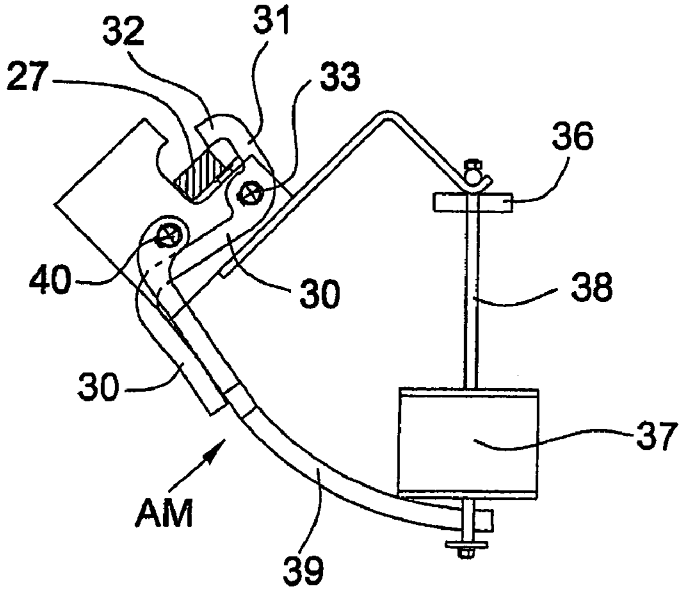
Figure 9:
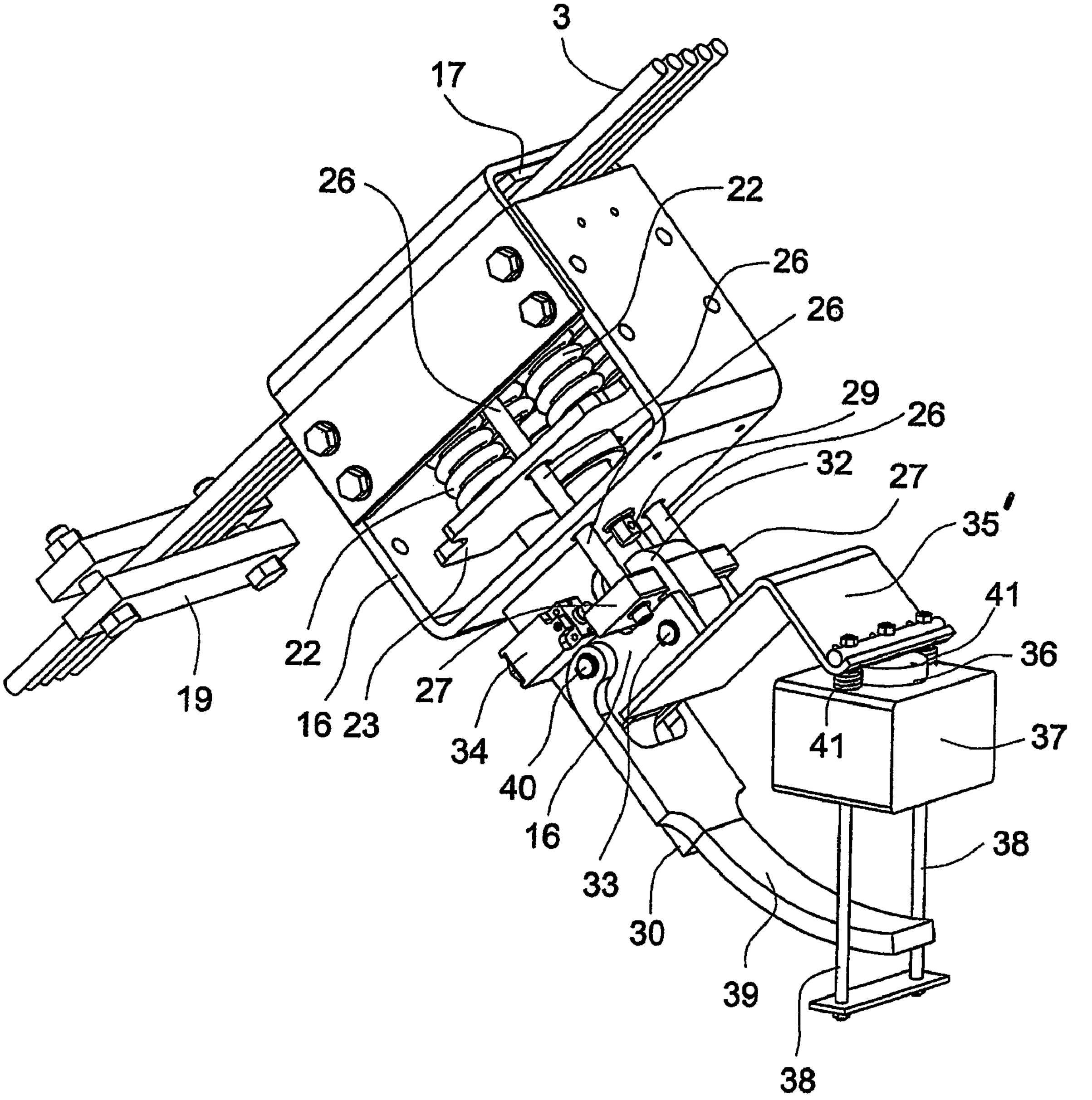
FIG. 9 is a perspective view of the cable brake shown in FIGS. 7 and 8.

FIG. 7 and FIG. 8 show the principal construction of a cable brake 15' according to the present invention with a slanted cable path. FIG. 9 is a perspective representation of the cable brake with the slanted cable path. The cable path extends at an angle "n" relative to the vertical and the cable brake 15' is the same as the previously discussed cable brake 15 with the exception of a modified bracket 35'. With that, the vertical arrangement of the guide rods 38 remains to retain the manner of functioning of the mass element 37. In the released fall, the mass element 37 impacts a second trigger lever 39, mounted for rotation at a second axis 40 of rotation, and operates the first trigger lever 28. FIG. 8 shows the position of the pawl 32 after the fall of the mass 37 on the second trigger lever 39.

Figure 10:
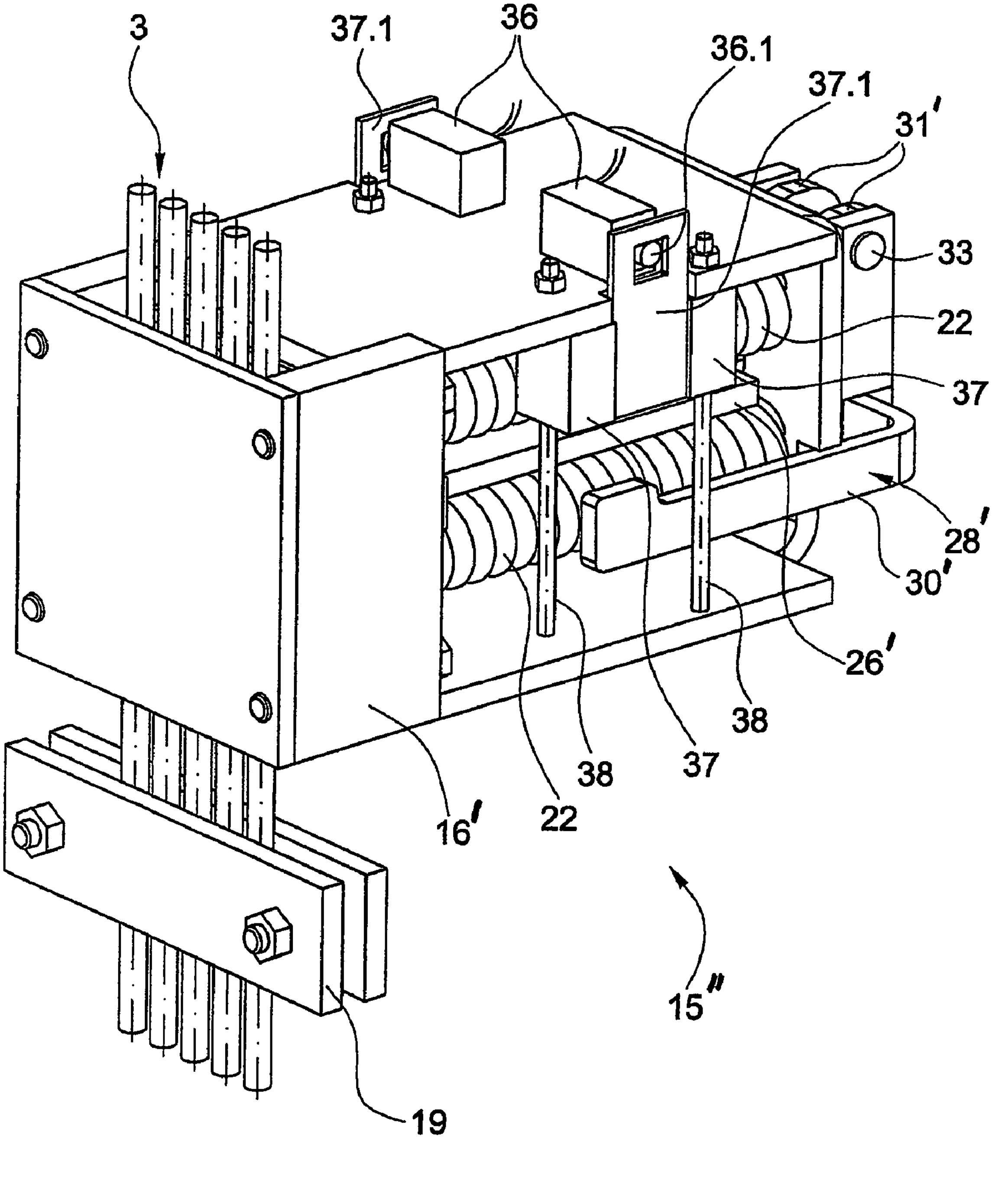
FIG. 10 is perspective view of an alternate embodiment of the cable brake according to the present invention with a vertical cable path.
Figure 11:
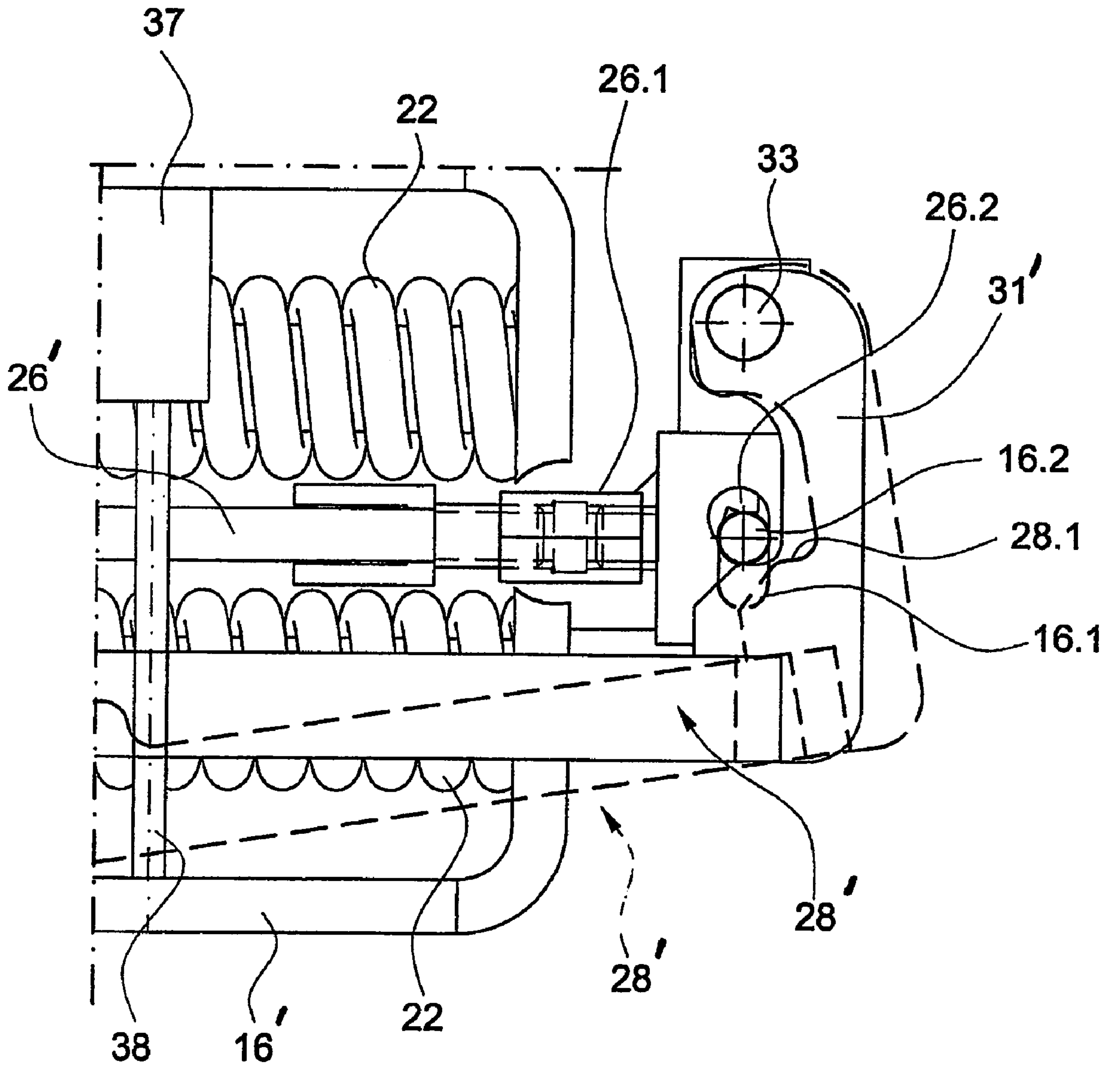
FIG. 11 is an enlarged side elevation view of the trigger mechanism shown in FIG. 10.

FIG. 10 shows an alternate embodiment cable brake 15" according to the present invention. The pressure springs 22 are supported at one end by a housing 16' and at an opposite end by the first pressure plate 21. A single release bar 26' has one end attached to the first pressure plate 21 and an opposite end threadably engaging a dual threaded adjusting nut or coupler 26.1 (FIG. 11). A pair of guide rods 38 at each side of the housing 16' mounts one of a pair of mass elements 37 each having an apertured plate 37.1. Each of a pair of electromagnets 36 has an armature bolt 36.1 that engages a corresponding one of the apertures in the plates 37.1 to hold the mass elements in the upward position shown in the drawings. When the electromagnets 36 are switched off, the armature bolts 36.1 are withdrawn and the mass elements 37 fall each impacting an associated first arm 30' of a U-shaped first trigger lever 28' having a second arm 31'. This rotates the trigger lever 28' about the axis 33.

FIG. 11 shows details of the release mechanism of the cable brake 15". The release trigger 28' is represented in solid line in a first position. A vertically elongated slot 16.1 is formed in the housing of 16 and receives a bolt 16.2. A pawl 28.1 of the trigger lever 28' forces the bolt 16.2 upwardly in the slot 16.1 to engage a pawl 26.2 threaded into the coupler 26.1 at the free end of the release bar 26' to hold the second brake plate 18 (not shown) away from the cable strands 3. Upon rotational movement of the trigger lever 28' to the position shown in dashed line in response to the fallen mass elements 37, the pawl 28.1 releases the bolt 16.2 to move downwardly. The falling bolt 16.2 releases the pawl 26.2 and, under the effect of the pressure springs 22, the release bar 26' is moved in the direction of the cable strands 3 and the brake action is introduced.

The return or resetting of the release bar 26' takes place by rotation of the coupler 26.1. Upon return of the trigger lever 28' to the solid line position, rotation of the coupler 26.1 in a first direction extends the pawl 26.2 from the release bar 26' into engagement with the bolt 16.2. Then rotation of the coupler 26.1 in the opposite direction draws the release bar 26' toward the pawl 26.2 to disengage the second brake plate 18 from the cable strands 3 and again compress the pressure springs 22.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable brake for an elevator for halting a cable strand comprising:

a fixed brake plate;

a moveable brake plate mounted to permit the cable strand to pass between said fixed brake plate and said moveable brake plate;

a spring means connected to said moveable brake plate;

a release mechanism connected to said moveable brake plate wherein actuation of said release mechanism releases said spring means from a pre-stressed condition and permits said spring means to move said moveable brake plate toward said fixed brake plate to a braking position to apply a braking force generated by said spring means to the cable strand; and a return mechanism connected to said moveable brake plate for moving said moveable brake plate from the braking position and away from the cable strand to a normal operating position to remove the braking force, said return mechanism including adjusting means for pre-stressing said spring means and setting the normal operating position of said moveable brake plate, wherein said spring means is connected between a first pressure plate at said moveable brake plate and a second pressure plate, said adjusting means selectively moving said second pressure plate along a path between two end positions relative to said first pressure plate for pre-stressing said spring means in the normal operating position.

2. The cable brake according to claim 1 including a brake housing for mounting said second pressure plate and wherein said adjusting means includes a screw rotatably mounted on said housing and a nut mounted at said second pressure plate and cooperating with said screw.

3. The cable brake according to claim 1 wherein said release mechanism includes a trigger lever holding said movable brake plate away from the cable strand against a biasing force applied to said moveable brake plate by said spring means.

4. The cable brake according to claim 3 including a release bar connected to said moveable brake plate and wherein said trigger lever has a pawl for releasably retaining said release bar.

5. The cable brake according to claim 3 including a mass element for impacting said trigger lever to release said release bar from said pawl.

6. The cable brake according to claim 5 including an electromagnet for selectively retaining said mass element spaced above said trigger lever.

7. A cable brake for an elevator for halting a cable strand comprising:

a housing;

a fixed brake plate attached to said housing;

a moveable brake plate mounted on said housing to permit the cable strand to pass between said fixed brake plate and said moveable brake plate;

a spring means connected to said moveable brake plate;

a release mechanism connected to said moveable brake plate wherein actuation of said release mechanism releases said spring means from a pre-stressed condition and permits said spring means to move said moveable brake plate toward said fixed brake plate to a braking position to apply a braking force generated by said spring means to the cable strand; and a return mechanism connected to said moveable brake plate for moving said moveable brake plate from the braking position and away from the cable strand to a normal operating position to remove the braking force, said return mechanism including adjusting means for pre-stressing said spring means and setting the normal operating position of said moveable brake plate, wherein said spring means is connected between a first pressure plate at said moveable brake plate and a second pressure plate, said adjusting means selectively moving said second pressure plate along a path between two end positions relative to said first pressure plate for pre-stressing said spring means in the normal operating position.

8. The cable brake according to claim 7 wherein said adjusting means includes a screw rotatably mounted on said housing and a nut mounted at said second pressure plate and cooperating with said screw.

9. A cable brake for an elevator for halting a cable strand comprising:

a housing;

a fixed brake plate attached to said housing;

a moveable brake plate mounted on said housing to permit the cable strand to pass between said fixed brake plate and said moveable brake plate;

a spring means connected to said moveable brake plate;

a release mechanism connected to said moveable brake plate wherein actuation of said release mechanism releases said spring means from a pre-stressed condition and permits said spring means to move said moveable brake plate toward said fixed brake plate to a braking position to apply a braking force generated by said spring means to the cable strand;

a return mechanism connected to said moveable brake plate for moving said moveable brake plate from the braking position and away from the cable strand to a normal operating position to remove the braking force, said return mechanism including adjusting means for pre-stressing said spring means and setting the normal operating position of said moveable brake plate, wherein said spring means is connected between said moveable brake plate and said housing, said adjusting means selectively moving said moveable brake plate for pre-stressing said spring means in the normal operating position; and including a release bar connected to said moveable brake plate and wherein said adjusting means includes a rotatable coupler connected between an end of said release bar and said housing.

10. A cable brake for an elevator for halting a cable strand composing:

a fixed brake plate;

a moveable brake plate mounted to permit the cable strand to pass between said fixed brake plate and said moveable brake plate;

a spring means connected to said moveable brake plate;

a release mechanism connected to said moveable brake plate wherein actuation of said release mechanism releases said spring means from a pre-stressed condition and permits said spring means to move said moveable brake plate toward said fixed brake plate to a braking position to apply a braking force generated by said spring means to the cable strand;

a return mechanism connected to said moveable brake plate for moving said moveable brake plate from the braking position and away from the cable strand to a normal operating position to remove the braking force, said return mechanism including adjusting means for pre-stressing said spring means and setting the normal operating position of said moveable brake plate;

a release bar connected to said moveable brake plate and wherein said adjusting means includes a rotatable coupler connected between an end of said release bar and said housing; and a brake housing and wherein said spring means is connected between said moveable brake plate and said housing, said adjusting means selectively moving said moveable brake plate for pre-stressing said spring means in the normal operating position.

11. The cable brake according to claim 10 wherein said release mechanism includes a trigger lever holding said movable brake plate away from the cable strand against a biasing force applied to said moveable brake plate by said spring means.

12. The cable brake according to claim 11 including a release bar connected to said moveable brake plate and wherein said trigger lever has a pawl for releasably retaining said release bar.

13. The cable brake according to claim 11 including a mass element for impacting said trigger lever to release said release bar from said pawl.

14. The cable brake according to claim 13 including an electromagnet for selectively retaining said mass element spaced above said trigger lever.

* * * * *

UNITED STATES PATENT AND TRADEMARK OFFICE

CERTIFICATE OF CORRECTION

PATENT NO. : 7,543,690 B2
APPLICATION NO. : 11/304008
DATED : June 9, 2009
INVENTOR(S) : Rudolf Eckenstein et al.

It is certified that error appears in the above-identified patent and that said Letters Patent is hereby corrected as shown below:

Cover Page, item [60] insert the following --This application is a CON of PCT/CH04/00348 06/09/2004--

Cover Page, item [30] Priority Document: insert the following --EUROPEAN PATENT OFFICE (EPO) 03405430.4 06/16/2003--

Signed and Sealed this

Eighth Day of September, 2009

David J. Kappos
*Director of the United States Patent and Trademark Office*